(12) United States Patent
Salisbury, Jr. et al.

(10) Patent No.: US 10,941,821 B2
(45) Date of Patent: Mar. 9, 2021

(54) FOUR-STATE BRAKE MODULE FOR USE AS A JOINT IN A MECHANICAL LINKAGE

(71) Applicant: The Board of Trustees of the Leland Stanford Junior University, Stanford, CA (US)

(72) Inventors: J. Kenneth Salisbury, Jr., Mountain View, CA (US); Peter Gerrit Lowe, San Jose, CA (US); Austin D. Epps, San Jose, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 62 days.

(21) Appl. No.: 16/422,129

(22) Filed: May 24, 2019

(65) Prior Publication Data

US 2019/0360538 A1 Nov. 28, 2019

Related U.S. Application Data

(60) Provisional application No. 62/676,538, filed on May 25, 2018.

(51) Int. Cl.
*F16D 49/04* (2006.01)
*F16D 65/16* (2006.01)
(Continued)

(52) U.S. Cl.
CPC ............ *F16D 49/04* (2013.01); *F16D 65/16* (2013.01); *F16D 2121/24* (2013.01); *F16D 2125/48* (2013.01); *F16D 2125/582* (2013.01)

(58) Field of Classification Search
CPC ...... F16D 49/04; F16D 2121/24; F16D 65/16; F16D 13/08; F16D 15/00;
(Continued)

(56) References Cited

U.S. PATENT DOCUMENTS 2,922,220 A 1/1960 Sacchini
3,521,730 A * 7/1970 Weatherby ............. F16D 67/02
192/12 BA
(Continued)

FOREIGN PATENT DOCUMENTS

EP 0176204 4/1986
EP 0235305 9/1987
(Continued)

OTHER PUBLICATIONS

Plooij et al. Review of locking devices used in robotics. EEE Robotics and Automation Magazine, vol. 22, No. 1, Mar. 2015.
(Continued)

*Primary Examiner* — Pamela Rodriguez
(74) *Attorney, Agent, or Firm* — Lumen Patent Firm

(57) ABSTRACT

A four-state joint brake module is provided to selectably stop or allow motion in both directions resulting in a mechanism that has four possible states: 1) allowing rotation only in a clockwise direction, 2) allowing rotation only in a counter-clockwise direction, 3) allowing free rotation in both directions, and 4) stopping motion in both directions. In robotic and other motion control applications the use of this four-state joint brake module in a multi-segmented linkage allows for position holding without continuous application of power and "fail safe" behavior. It further allows for the ability to toggle this useful state behavior independently in either direction and is relevant for robotic applications.

11 Claims, 3 Drawing Sheets

(51) Int. Cl.
*F16D 125/48* (2012.01)
*F16D 125/58* (2012.01)
*F16D 121/24* (2012.01)

(58) Field of Classification Search
CPC .. F16D 2023/123; F16D 51/22; F16D 41/206; F16D 2127/06; F16D 2125/48; F16D 2125/582
USPC ............ 188/162, 157, 158, 166; 192/12 BA, 192/12 R, 70.23, 56.6, 150, 56.51, 56.52
See application file for complete search history.

(56) References Cited

U.S. PATENT DOCUMENTS

| | | | | |
|---|---|---|---|---|
| 3,559,781 A | * | 2/1971 | Brunelle | ................. F16D 67/02 192/12 BA |
| 3,987,880 A | * | 10/1976 | Holland-Letz | ........... B41J 29/38 192/12 BA |
| 4,059,176 A | * | 11/1977 | Lowery | ................. F16D 13/025 192/12 BA |
| 4,189,040 A | * | 2/1980 | Braunschweig | ...... F16D 13/025 192/26 |
| 4,860,864 A | | 8/1989 | Cwycyshyn | |
| 4,892,175 A | | 1/1990 | Van Erden | |
| 5,090,530 A | | 2/1992 | Leone | |
| 5,219,045 A | | 6/1993 | Porter | |
| 5,950,783 A | * | 9/1999 | Cahill | ................... F16D 27/105 192/12 BA |
| 8,776,977 B2 | | 7/2014 | Lansberry | |
| 9,772,029 B2 | * | 9/2017 | Thomas | .................. F16H 57/10 |
| 2010/0108454 A1 | | 5/2010 | Takada | |

FOREIGN PATENT DOCUMENTS

| | | |
|---|---|---|
| WO | WO2008031538 | 3/2008 |
| WO | WO2017144302 | 8/2017 |

OTHER PUBLICATIONS

Mike Leone at Thomson published online https://www.thomsonlinear.com/downloads/articles/Selecting_Wrap_Spring_Clutch_Brake_for_Optimal_Performance_taen.pdf.

* cited by examiner

FOUR-STATE BRAKE MODULE FOR USE AS A JOINT IN A MECHANICAL LINKAGE

CROSS-REFERENCE TO RELATED APPLICATIONS

This application claims priority from US Provisional Patent Application 62/676,538 filed May 25, 2018, which is incorporated herein by reference.

FIELD OF THE INVENTION

The invention relates to methods, devices and systems for controlling the operation of a brake joining two or more bodies or linkages.

BACKGROUND OF THE INVENTION

Brakes and clutches are used to impede or allow relative motion between two bodies. Examples include, brakes in the car that stop relative motion between the wheels and the car chassis, clutches in the drive train of a car that control motion between the engine and the drive shaft and brakes in a robotic arm that are able to stop motion about the axis of a revolute joint joining adjacent links.

Common brakes can impede motion by frictional engagement as well as structural engagement. Disk and drum brakes are examples of friction brakes. Ratchets are an example of a structural engagement means.

Toothed face brakes and clutches are another type of motion-stopping and engagement mechanisms that utilize structural engagement to couple and uncouple motion between bodies. While these have the advantage of typically having three times more torque for given diameter than typical friction-based devices they, like other structural engagement devices, cannot be engaged while in motion.

Overrunning or one-way clutches such as spring clutches allow torque to be transmitted to a load in one direction. They are useful for driving a load in one direction when it is possible or necessary for the load to occasionally move ahead of the driving motor.

Spring wrap clutches and brakes are another example of one-way mechanisms. They achieve their stopping power due to the friction caused by wrapping a coil of wire about a stationary and a moving shaft. They permit rotation in one direction like overrunning clutches and have the advantage that they can be switched on and off by slightly displacing the tang on one end of the spring. They also have the advantages they can very rapidly stop motion at any angle, that they require very little force to engage and disengage and that they can be engaged while in motion. Spring wrap clutches have the advantage over other types of friction-based devices in that they have very high torque densities with achievable torques that increase exponentially with the number of wraps around the shaft.

In robotics and other motion control contexts it is sometimes desirable to selectively allow motion in one direction, but not in another. In a lifting or hoisting context it is useful for a person to be able to momentarily/partly lift a load then rest while a ratchet (or one-way clutch) holds the load in place while the worker prepares for the next increment of lifting. To lower the load the ratchet must disengaged, thus requiring a switchable one-way brake such as a ratchet or spring clutch. Spring wrap clutches are used to great advantage for precisely stopping the motion of conveyor belts and paper drives in photocopy machines, for example, because of their ability to be very quickly engaged and their high torque density. In robotics and haptics it would be advantageous to use a spring wrap clutch/brake to impede or allow motion in one direction, but not in the opposite direction.

The present invention advances the technology for robotics, haptics and other motion control contexts by providing a four-state joint brake module which can be integrated as a joint for two linkages.

SUMMARY OF THE INVENTION

The four-state joint brake modules described herein are constructed by combining two spring wrap clutches, aligned in opposite directions so that together they can allow or impede motion independently in both directions. This has the advantage of creating a mechanism that can selectably stop or allow motion in both directions, resulting in a mechanism that has four distinctly possible states:
1) allowing rotation only in a clockwise direction,
2) allowing rotation only in a counter-clockwise direction,
3) allowing free rotation in both directions, and
4) stopping motion in both directions.

In addition to this bi-directional capability this new mechanism inherits all the advantages of traditional spring wrap clutches including:
  Low actuation/de-actuation force (including when the brake is operating) compared to ratchets, face clutches and other structurally restraining brakes.
  High ratio of braked torque to free-running torque compared drum and disk brakes.
  High ratio of braking torque capacity to volume compared to other friction brakes.
  Not quantized stopping positions compared to ratcheted and toothed face clutches.
  Low backlash compared to structurally dependent brake systems.
  Capable of statically positioning a mechanical linkage without power input.
  By selectively toggling the two coil springs independently the brake module may achieve four braking configurations (bi-directionally braked, uni-directionally braked in either direction, or free-running), unlike any of the aforementioned brake and clutch technologies.

The four-state joint brake module can, for example, enable the following use cases:
  Guided and constrained motion: for example, guiding an operator to a desired joint configuration; maintaining desirable joint relationships between successive joints in a multi-link device during joint movement; controlling internal motion in multi-link user-positionable devices such as those used in metrology (a device with more degrees of freedom than necessary to achieve a desired position and/or orientation has undefined internal degrees of freedom that our invention could allow to be selectively constrained)
  Robotic systems: for example, in creating higher dimensional constraint manifolds than can be achieved with traditional 2-state on-off brakes, enabling an extremely rich set of physical interaction opportunities.
  Virtual reality interfaces: for example, by creating simulated uni-sense contact forces in light-weight haptic interfaces.

BRIEF DESCRIPTION OF THE DRAWINGS

1=First rotating mandrel.
2=Shaft.
3=Second Fixed Mandrel, and Third Fixed Mandrel.

4=First coil spring, and Second Coil Spring.
5=Housing end-caps.
6=Cylindrical Housing.
There is no item 7-10.
11=First Control Tang, and Second Control Tang.
12=Notched features to allow the First and Second Control Tang to be placed in.
There is no item 13-20.
21=Control Tang.
22=Tang Actuator to act on a Control Tang 21.
23=Gear Motors to Rotate Tang Actuator 22.

DETAILED DESCRIPTION

A four-state joint brake module is provided which is based on three mandrels; a first rotating mandrel and two fixed mandrels which are referred to as the second and third fixed mandrel. The two fixed mandrels reduce the degrees of freedom of the shaft of the first rotating mandrel. Two independently and separately controlled coil springs then constrain the rotation of the shaft, i.e. the rotation of the first rotating mandrel. The combination of the independent and separate control of the two coil springs result in the four-state joint brake module to be controlled in four different control states, which are defined as:

(1) a locked state of the shaft,
(2) a free state of the shaft,
(3) a braking in first direction of the shaft, and
(4) a braking in a second direction of the shaft.

Figure 1:
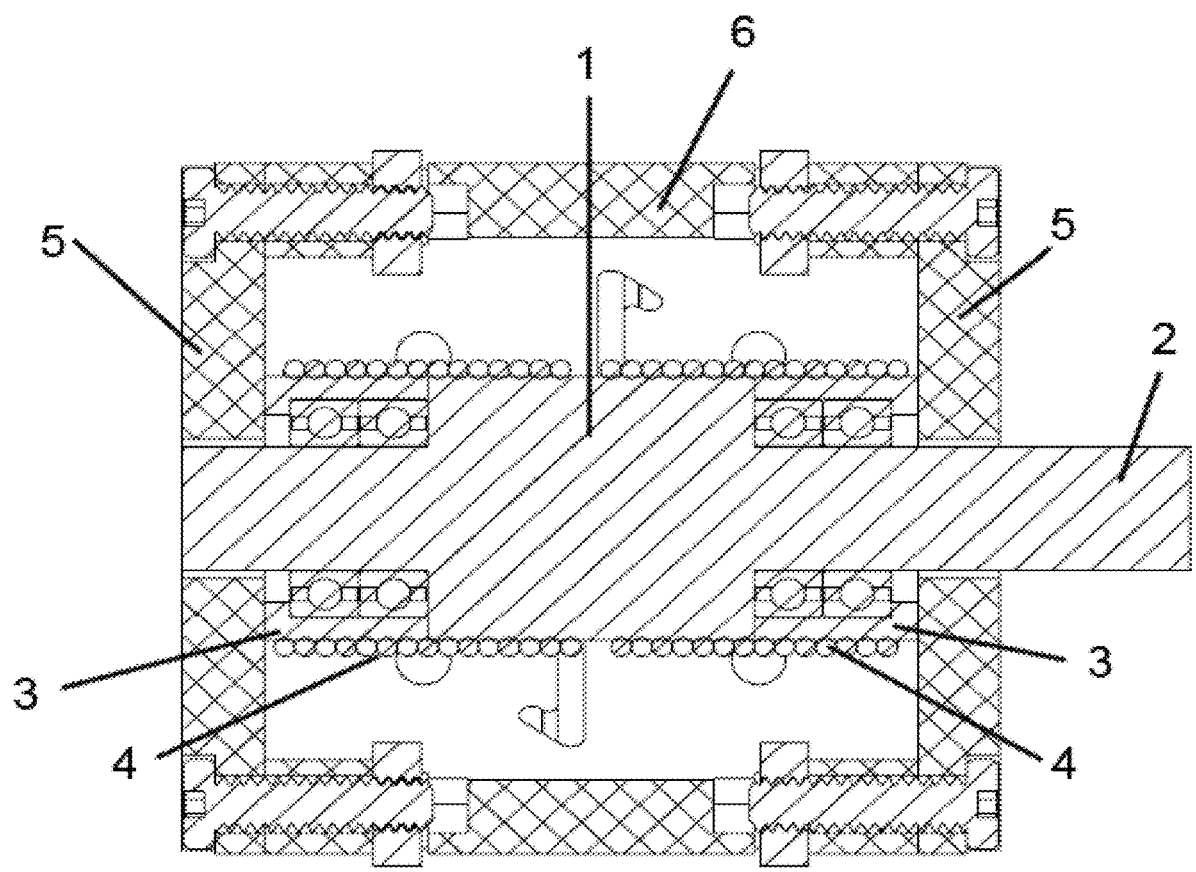
FIGS. 1-3 show a four-state joint brake module according to exemplary embodiments of the invention.
Figure 2:
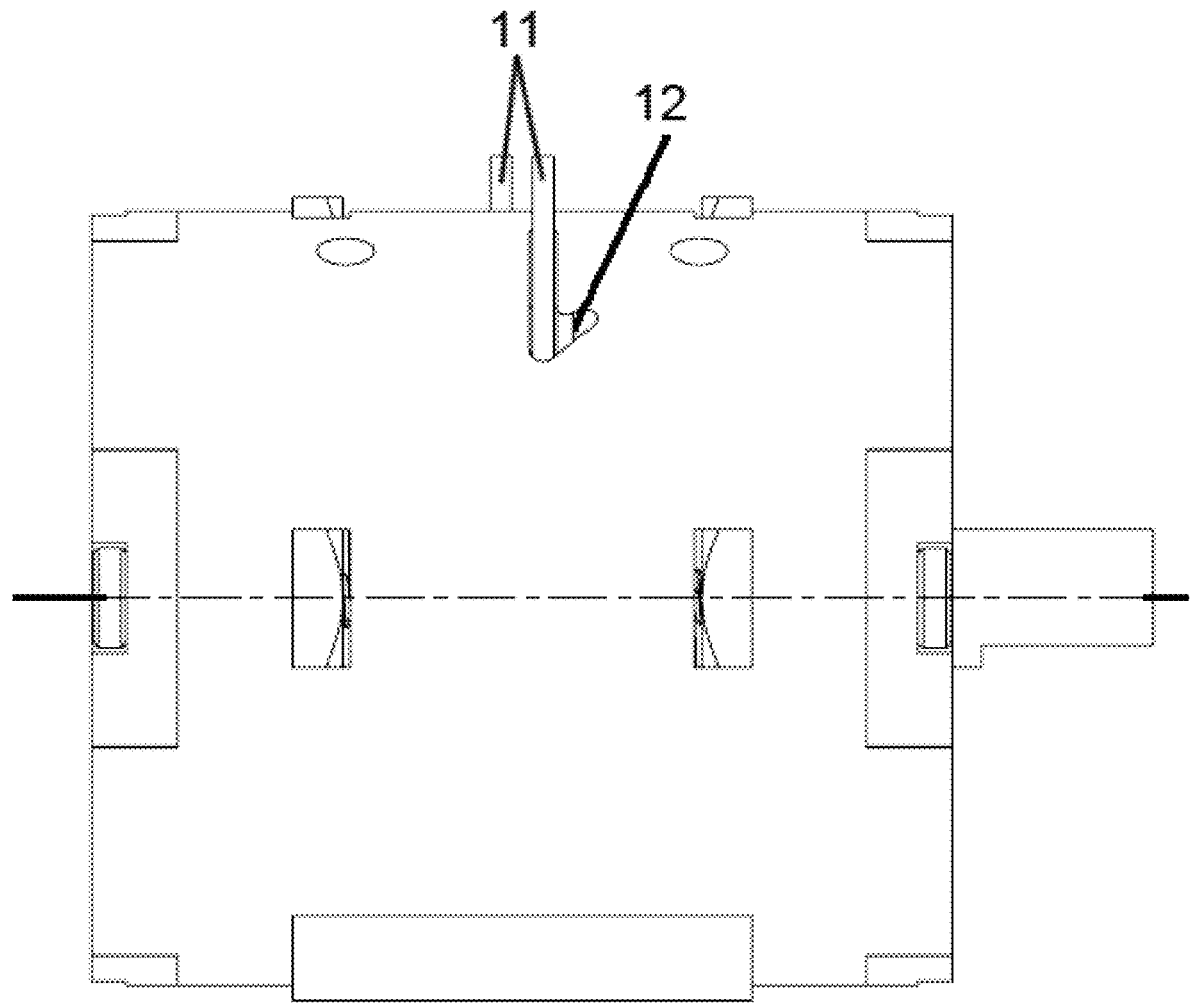
Figure 3:
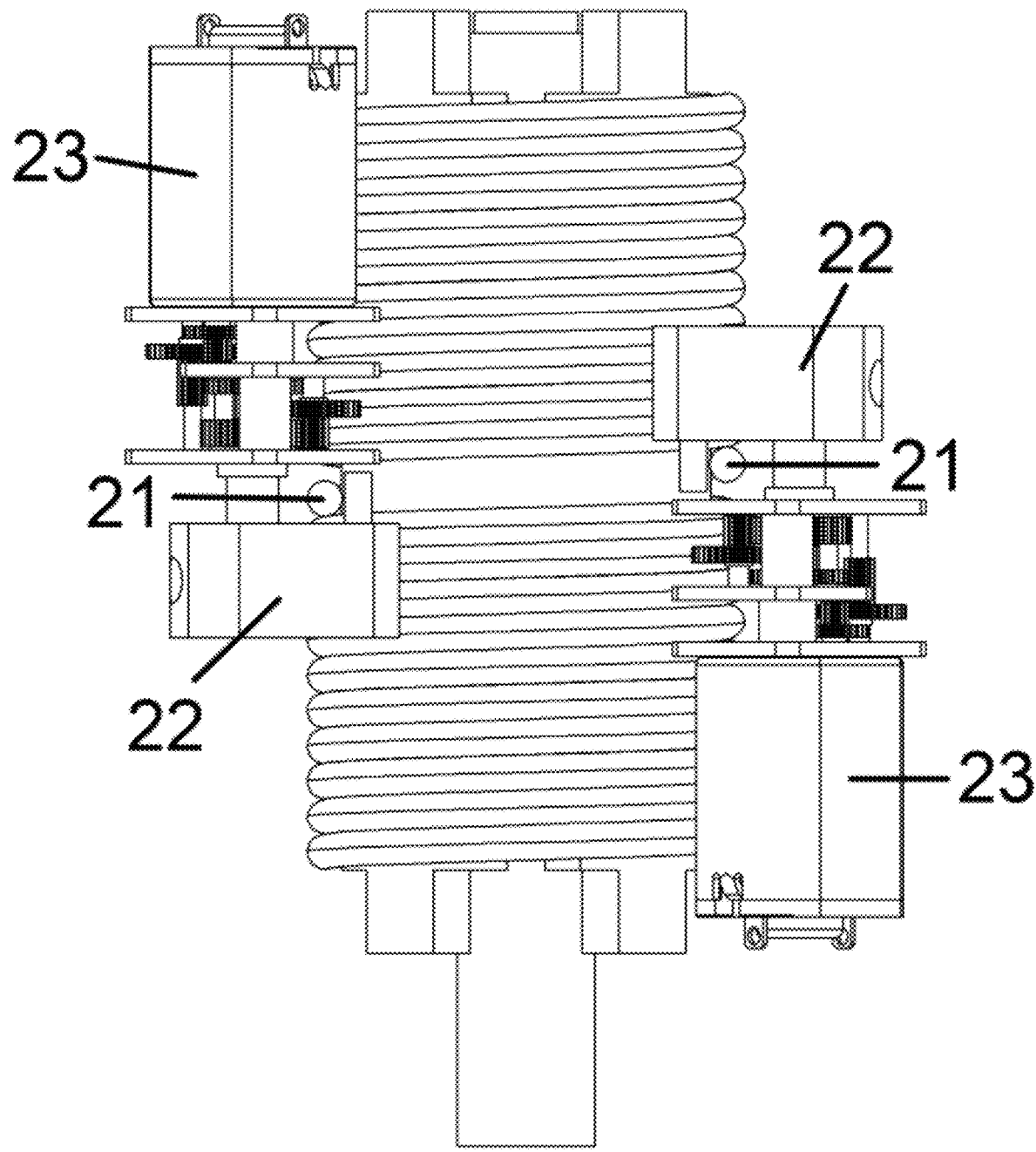

Referring to FIGS. 1-3, structurally the four-state joint brake module has a first rotating mandrel distinguishing a first aspect and a second aspect. The first rotating mandrel has a shaft extending from either side of the first rotating mandrel. The shaft defines the axis of rotation for the first rotating mandrel such that the first rotating mandrel is capable of rotating around this coaxial axis of the shaft.

The four-state joint brake module has a second fixed mandrel positioned around the first rotating mandrel's shaft at one side of the first rotating mandrel and positioned to allow the coaxial rotation of the first rotating mandrel.

The four-state joint brake module has a third fixed mandrel positioned around the first rotating mandrel's shaft at the other side of the first rotating mandrel and positioned to allow the coaxial rotation of the first rotating mandrel.

The surfaces of the three mandrels are preferably smooth and circular (surfaces are defined as the surface which would be perpendicular to the axis of rotation of the shaft). In no case, do these mandrel surfaces have significant discontinuous features or ratchets.

Each mandrel has a specified diameter: the first rotation mandrel has a first diameter, the second fixed mandrel has a second diameter and the third fixed mandrel has a third diameter. In one embodiment, all three diameters could be the same or substantially the same. However, in another embodiment, these diameters need not be the same. For example, the second diameter could be essentially the same as the first diameter, where the two respective mandrels touch. Vice versa, the third diameter could be essentially the same as the first diameter, where these two respective mandrels touch. In yet another embodiment or in other words, the diameters could be different as long as the first diameter has corresponding diameters at each end where the first diameter meets the respective second diameter or the third diameter.

The four-state joint brake module further has a first coil spring positioned around (i) the first diameter of the first aspect of the first rotating mandrel and (ii) the second diameter of a part of the second fixed mandrel. This first coil spring, at an end around the first aspect of the first rotating mandrel, has a first control tang capable of changing the diameter of the first coil spring. At an end around the second fixed mandrel, the first coil spring is attached to the second fixed mandrel.

The four-state joint brake module further has a second coil spring positioned around (i) the first diameter of the second aspect of the first rotating mandrel and (ii) the third diameter of a part of the third fixed mandrel. This second coil spring, at an end around the second aspect of the first rotating mandrel, has a second control tang capable of changing the diameter of the second coil spring. At an end around the third fixed mandrel, the second coil spring is attached to the third fixed mandrel.

In one embodiment, the first diameter, the second diameter and the third diameter are sized to provide an interference with the diameters of the first and second coil springs. This would place the four-state joint brake module in an initial locked position. In another embodiment, the first diameter, the second diameter and the third diameter are sized to fit around the diameters of the first and second coil springs without interference. This would place the four-state joint brake module in an initial unlocked position.

The four different control states of the four-state joint brake module are achieved by separately and independently controlling the first and second control tangs from each other and therewith respectively separately and independently controlling the diameter of the first coil spring and the second coil from each other. It is then the combination of controls of the first and second control tangs that result in the four-state joint brake module to be controlled in four different control states as defined infra.

In a further embodiment, the four-state joint brake module could have a first actuation mechanism for controlling the first control tang. Likewise, the four-state joint brake module could have a second actuation mechanism for controlling the second control tang. This first and second actuation mechanism could be envisioned as electrical, hydraulic, mechanical, magnetic, capacitive, or pneumatic.

In still a further embodiment, the four-state joint brake module could have one or more position or rotary sensors or potentiometers. The position sensing device may operate on resistive, capacitive, inductive, magnetic, optical, or any other suitable means. The output of the position sensing device may be used to modulate the brake state based on the detected position of the rotary shaft relative to a sensor. In one embodiment a Hall effect encoder (AMS AS5045) could be used to detect the angular position of a magnet pressed into the output shaft.

To package all the mandrels and coil springs, the four-state joint brake module could have a cylindrical housing. This housing could serve as a structural support to prevent rotation of the second fixed mandrel and the third fixed mandrel relative to one another and relative to the cylindrical housing. In one embodiment, the second and third fixed mandrels could be rigidly connected to a respective pair housing end-caps where the pair of housing end-caps rigidly connects to the cylindrical housing.

In yet another embodiment, a mechanical linkage (not shown) is provided that would benefit from the four-state control of the four-state joint brake module. The mechanical linkage has at least a first segment, a second segment, and the four-state joint brake module as a joint connecting the first segment and the second segment. The four-state joint brake module is defined as described herein. The first segment is attached to the first rotation mandrel and the second segment are attached to the housing of the four-state joint brake module. A skilled artisan could imagine a mechanical linkage with multiple segments and four-state joint brake modules as joints connecting these segments.

The invention also pertains to a method of using the mechanical linkage with multiple segments and four-state joint brake module as joints connecting these segments.

An example of use of a mechanical linkage is as a 'Third Arm' to physical actions of normal users, as an assistive device for disabled persons, as a haptic interface for interactions with remote systems (robots), virtual/simulated objects, and various combinations and other uses. The Third Arm could be attached to the user's body at one or more locations. An example mounting would be to attach a magnetic joint to a belt worn by the user. The Third Arm system can be used in a number of ways:

- It may act to passively support a person's body part, such as might by putting appropriate springs in the joints. Equally, it could be used to steady an unsteady person at the sink while they use both hands for grooming.
- It can be used as an assistant, to do such things as hold a business card in front of you while you dial your phone, hold your flashlight on your task, hold your beverage while your hands are collecting food at a buffet.
- A smart physical assistant that could perform actions in response to human requests, including those given by keyboard, myoelectric, verbal, gaze and other methods. Since this is effectively a robot it will be able to take advantage of all the emerging robotic component technologies in hardware and software.

Embodiments of the invention provide augmentation abilities, either natural abilities to superhuman levels such as allowing a construction worker to hold more tools or work faster, or augmenting degraded natural abilities to normal levels such as helping stabilize or hold objects for an elderly person with reduced motor function. It could also function as a haptic interface by providing touch feedback to a user based on digital input to allow them to more realistically interact with and be informed by experiences like VR, AR, or telepresence.

What is claimed is:

1. A four-state joint brake module, comprising:
   (a) a first rotating mandrel having a first section and a second section,
      wherein the first rotating mandrel has a shaft extending from both sides of the first rotating mandrel,
      wherein the first rotating mandrel is capable of rotating around a coaxial axis of the shaft, and
      wherein the first rotation mandrel has a first diameter;
   (b) a second fixed mandrel positioned around the first rotating mandrel's shaft at one side of the first rotating mandrel and positioned to allow the coaxial rotation of the first rotating mandrel, wherein the second fixed mandrel has a second diameter;
   (c) a third fixed mandrel positioned around the first rotating mandrel's shaft at the other side of the first rotating mandrel and positioned to allow the coaxial rotation of the first rotating mandrel, wherein the third fixed mandrel has a third diameter;
   (d) a first coil spring positioned around (i) the first diameter of the first section of the first rotating mandrel and (ii) the second diameter of a part of the second fixed mandrel,
      wherein the first coil spring, at an end around the first section of the first rotating mandrel, has a first control tang capable of changing the diameter of the first coil spring, and
      wherein the first coil spring, at an end around the second fixed mandrel, is attached to the second fixed mandrel;
   (e) a second coil spring positioned around (i) the first diameter of the second section of the first rotating mandrel and (ii) the third diameter of a part of the third fixed mandrel,
      wherein the second coil spring, at an end around the second section of the first rotating mandrel, has a second control tang capable of changing the diameter of the second coil spring,
      wherein the second coil spring, at an end around the third fixed mandrel, is attached to the third fixed mandrel, and
      wherein the first coil spring and the second coil spring are aligned in opposite directions so as to enable independently a resistance to motion of the first rotating mandrel in opposite directions;
   wherein by separately and independently controlling the first and second control tangs from each other and therewith respectively separately and independently controlling the diameter of the first coil spring and the second coil from each other, the combination of controls of the first and second control tangs result in the four-state joint brake module to be controlled in four different control states, which are defined as:
      (1) a locked state of the shaft,
      (2) a free state of the shaft,
      (3) a braking in a first direction of the shaft, and
      (4) a braking in a second direction of the shaft.

2. The four-state joint brake module as set forth in claim 1, further comprising a first actuation mechanism for controlling the first control tang, wherein the first actuation mechanism is electrical, hydraulic, mechanical, magnetic, capacitive, or pneumatic.

3. The four-state joint brake module as set forth in claim 1, further comprising a second actuation mechanism for controlling the second control tang, wherein the second actuation mechanism is electrical, hydraulic, mechanical, magnetic, capacitive, or pneumatic.

4. The four-state joint brake module as set forth in claim 1, further comprising one or more position or rotary sensors.

5. The four-state joint brake module as set forth in claim 1, further comprising a cylindrical housing as a structural support to prevent rotation of the second fixed mandrel and the third fixed mandrel relative to one another and relative to the cylindrical housing.

6. The four-state joint brake module as set forth in claim 5, wherein the second and third fixed mandrels are rigidly connected to a respective pair of housing end-caps, wherein the pair of housing end-caps rigidly connects to the cylindrical housing.

7. The four-state joint brake module as set forth in claim 1, wherein the first diameter, the second diameter and the third diameter are substantially identical.

8. The four-state joint brake module as set forth in claim 1, wherein the first diameter, the second diameter and the third diameter are sized to provide an interference with the diameters of the first and second coil springs, placing the four-state joint brake module in an initial locked position.

9. The four-state joint brake module as set forth in claim 1, wherein the first diameter, the second diameter and the third diameter are sized to fit around the diameters of the first and second coil springs without interference, placing the four-state joint brake module in an initial unlocked position.

10. A method of using one or more mechanical linkages as set forth in claim 1.

11. A mechanical linkage, comprising: a first segment, a second segment, and a four-state joint brake module as a joint connecting the first segment and the second segment, wherein the four-state joint brake module comprises:
  (a) a first rotating mandrel having a first section and a second section
    wherein the first rotating mandrel has a shaft extending from both sides of the first rotating mandrel,
    wherein the first rotating mandrel is capable of rotating around a coaxial axis of the shaft, and
    wherein the first rotation mandrel has a first diameter;
  (b) a second fixed mandrel positioned around the first rotating mandrel's shaft at one side of the first rotating mandrel and positioned to allow the coaxial rotation of the first rotating mandrel, wherein the second fixed mandrel has a second diameter;
  (c) a third fixed mandrel positioned around the first rotating mandrel's shaft at the other side of the first rotating mandrel and positioned to allow the coaxial rotation of the first rotating mandrel, wherein the third fixed mandrel has a third diameter;
  (d) a first coil spring positioned around (i) the first diameter of the first section of the first rotating mandrel and (ii) the second diameter of a part of the second fixed mandrel,
    wherein the first coil spring, at an end around the first section of the first rotating mandrel, has a first control tang capable of changing the diameter of the first coil spring, and
    wherein the first coil spring, at an end around the second fixed mandrel, is attached to the second fixed mandrel;
  (e) a second coil spring positioned around (i) the first diameter of the second section of the first rotating mandrel and (ii) the third diameter of a part of the third fixed mandrel,
    wherein the second coil spring, at an end around the second section of the first rotating mandrel, has a second control tang capable of changing the diameter of the second coil spring,
    wherein the second coil spring, at an end around the third fixed mandrel, is attached to the third fixed mandrel, and
    wherein the first coil spring and the second coil spring are aligned in opposite directions so as to enable independently a resistance to motion of the first rotating mandrel in opposite directions;
  wherein by separately and independently controlling the first and second control tangs from each other and therewith respectively separately and independently controlling the diameter of the first coil spring and the second coil from each other, the combination of controls of the first and second control tangs result in the four-state joint brake module to be controlled in four different control states, which are defined as:
    (1) a locked state of the shaft,
    (2) a free state of the shaft,
    (3) a braking in a first direction of the shaft, and
    (4) a braking in a second direction of the shaft;
  wherein the first segment is attached to the first rotation mandrel and the second segment are attached to a housing of the four-state joint brake module, wherein the housing is a structural support to prevent rotation of the second fixed mandrel and the third fixed mandrel relative to one another and relative to the housing.

* * * * *